No. 855,578. PATENTED JUNE 4, 1907.
G. HOEPNER.
AUTOMATIC WEIGHING MACHINE.
APPLICATION FILED JUNE 8, 1906.
5 SHEETS—SHEET 3.
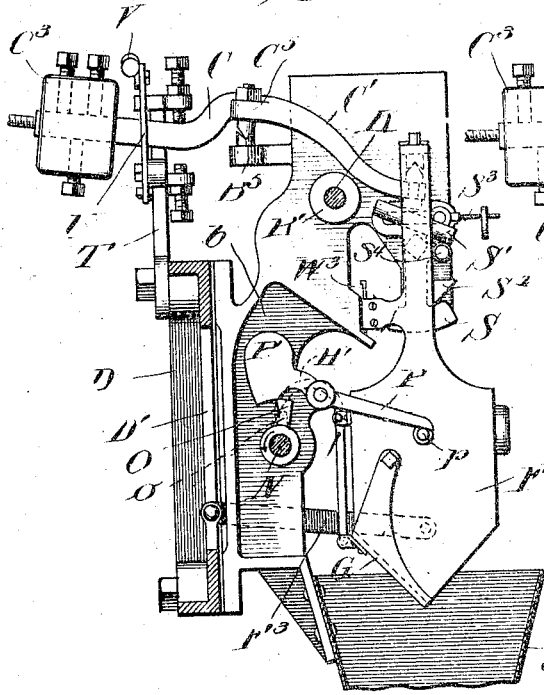
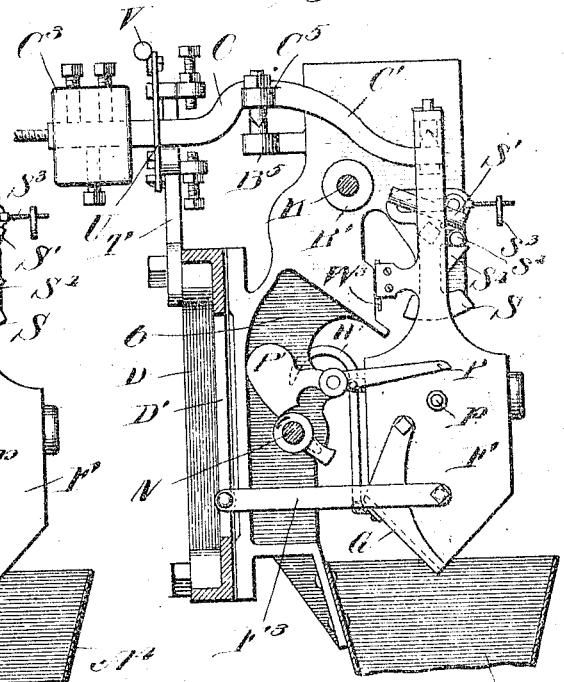
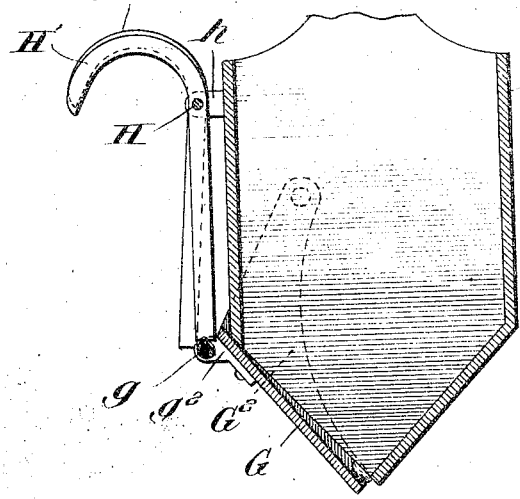
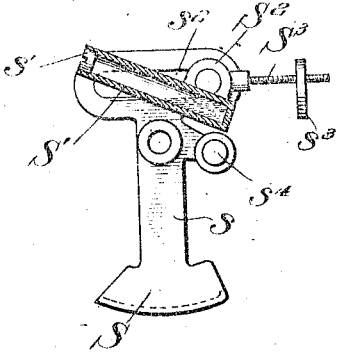
Witnesses
Inventor
George Hoepner
by Lamberton & Wilkinson
his Attorneys

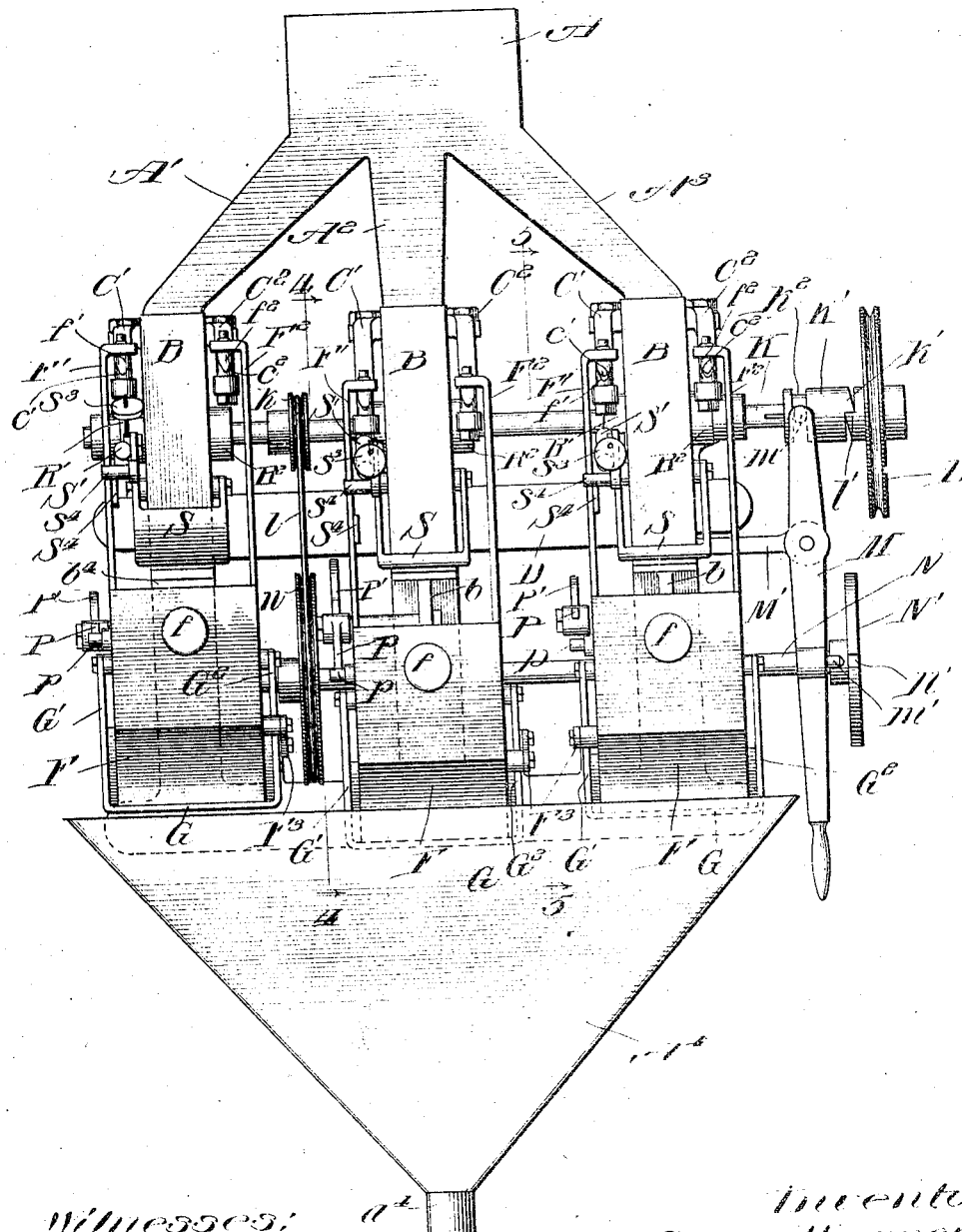

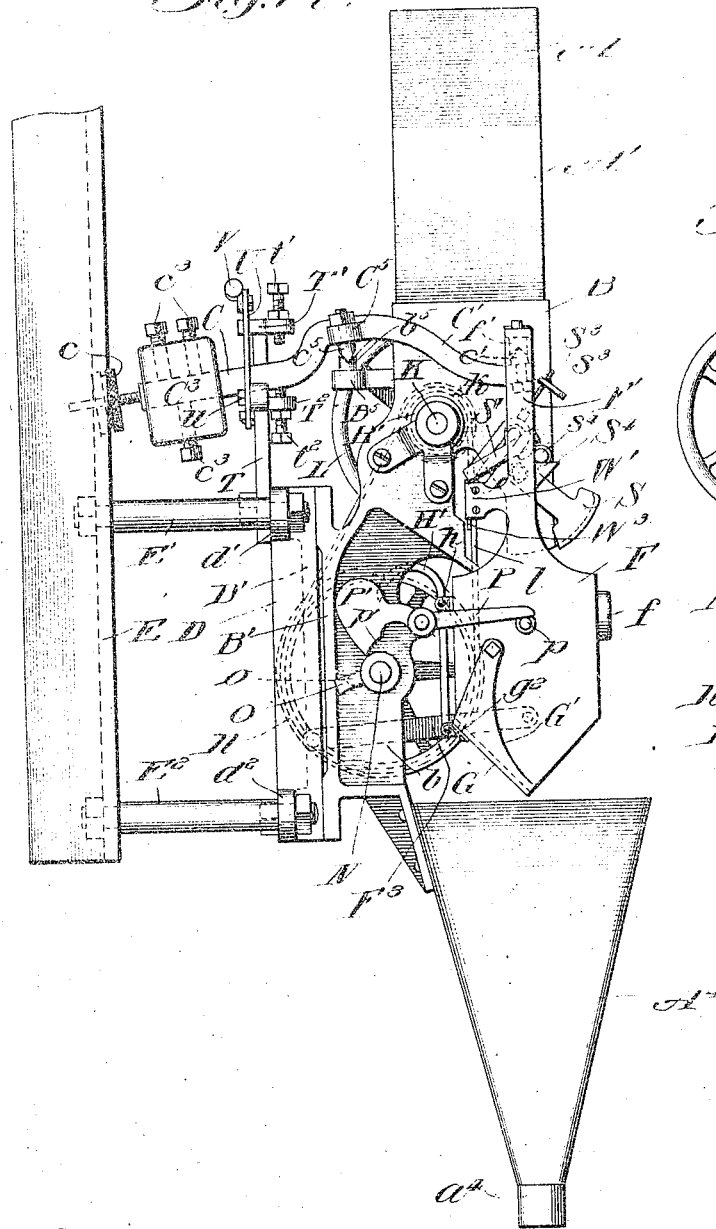
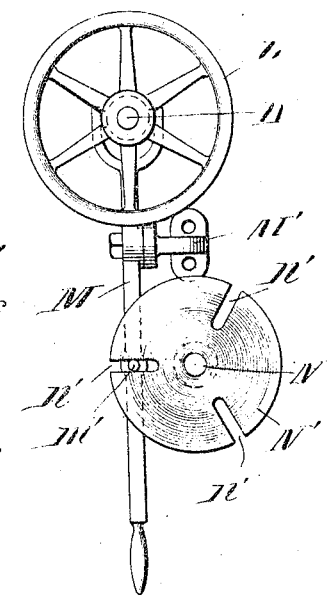

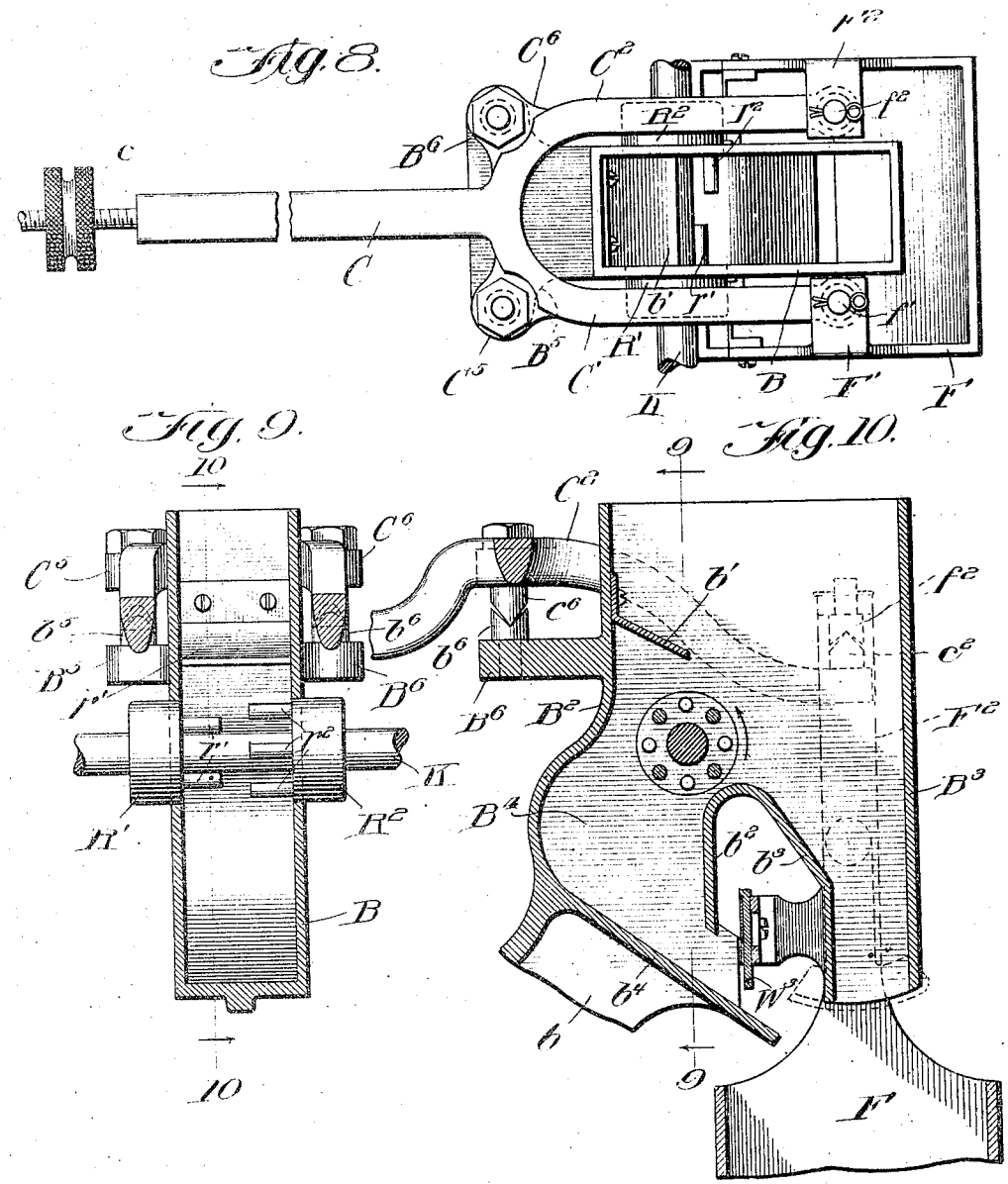

No. 855,578. PATENTED JUNE 4, 1907.
G. HOEPNER.
AUTOMATIC WEIGHING MACHINE.
APPLICATION FILED JUNE 8, 1906.
5 SHEETS—SHEET 5.
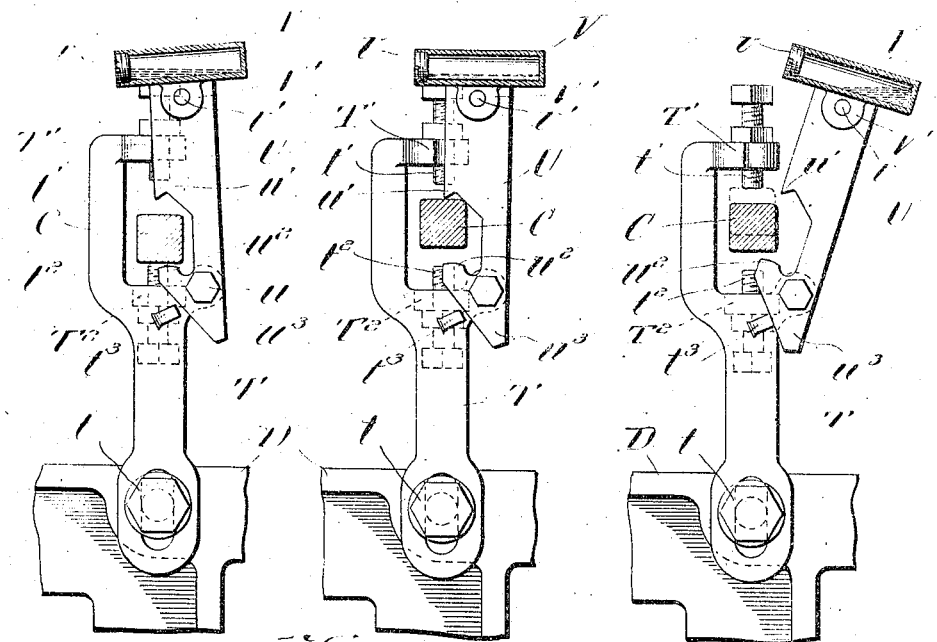
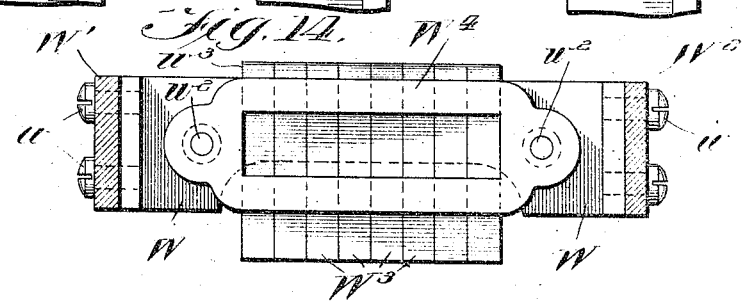
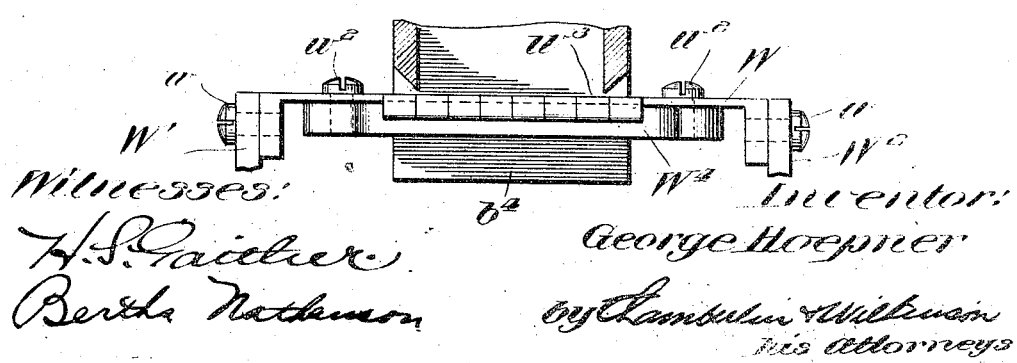
Witnesses:
H. S. Gaither
Bertha Nathanson
Inventor:
George Hoepner
by Lamberton & Wilkinson
his Attorneys

UNITED STATES PATENT OFFICE.

GEORGE HOEPNER, OF CHICAGO, ILLINOIS.

AUTOMATIC WEIGHING-MACHINE.

No. 855,578.   Specification of Letters Patent.   Patented June 4, 1907.

Application filed June 8, 1906. Serial No. 320,847.

*To all whom it may concern:*

Be it known that I, GEORGE HOEPNER, a citizen of the United States, residing at Chicago, county of Cook, State of Illinois, have invented a certain new and useful Improvement in Automatic Weighing-Machines; and I declare the following to be a full, clear, and exact description of the same, such as will enable others skilled in the art to which it pertains to make and use the same, reference being had to the accompanying drawings, which form a part of this specification.

My invention relates in general to automatic scales, and more particularly to power controlling automatic weighing machines.

In order that automatic weighing machines may have an increased capacity they have been constructed with a plurality of automatic scales all receiving the material from the same source and all discharging the weighed quantities of material through a common outlet, where the successive quantities of material are received in bags or other containers. In this type of weighing machines it is necessary that there should be a slight interval between the successive discharges of material, in order that the weighed quantities may be kept separate from those preceding and following.

When the material is delivered to the weighing receptacle, by gravity alone, the rapidity of operation depends upon the condition of the material, which if dry will readily flow by gravity and thereby increase the rapidity of operation of the machine, but if moist will flow more slowly and decrease the rapidity of action.

My invention has for one of its objects to provide a weighing machine comprising a plurality of automatic scales all discharging to a common outlet, in which the successive discharge of quantities of weighed material will be kept separate and at the same time follow each other as quickly as practicable.

A further object of my invention is to provide an automatic weighing apparatus in which the material will be positively fed to the weighing receptacles, and which may be adjusted according to the character of the material to be weighed.

A still further object of my invention is to provide an automatic weighing machine of the type comprising a weighing receptacle to which the material passes through a main supply and a supplemental or completing supply, in which both the main and the supplemental supplies will be directly controlled by the sinking and rising of the receptacle.

A still further object of my invention is to provide an automatic weighing machine of the type comprising a weighing receptacle to which the material passes through a main supply and supplemental supply, in which the supplemental supply will be controlled by a gate comprising a plurality of independently movable sections whereby a particle of material caught beneath the gate will only hold one section thereof open and will permit the other sections to close.

A still further object of my invention is to provide an automatic weighing machine which will be comparatively simple in construction, which will be accurate and positive in operation, and which possesses the highest practical speed.

My invention may be generally described as comprising a plurality of automatic scales, a common source of material leading to all of said scales, a common discharge funnel leading from all of the scales, each scale comprising a weighing receptacle, a main supply passage leading to the receptacle and counterbalanced gate for opening and closing the main supply controlled by the rising and falling of the receptacle, a supplemental supply passage, a gate comprising separate vertically movable sections carried by the receptacle for opening and closing the supplemental passage, a power shaft extending through the supplemental supply passages of all of the scales, pins carried by said shaft for positively feeding material through the supplemental supply passages, a gravity discharge gate closing the lower end of each receptacle, a latch for retaining each discharge gate closed, a counter shaft rotated by the power shaft, radial projections on said shaft for successively engaging the latches of the several discharge gates, means actuated by said counter shaft to control the rising of each receptacle, and means for interrupting the lowering of each receptacle after the closing of the main supply gate.

My invention will be more fully described hereinafter with reference to the accompanying drawings in which the same is illustrated as embodied in a convenient and practical form, and in which:

Figure 1 is a front elevational view; Fig. 2 a side elevational view looking from the left in Fig. 1; Fig. 3 a detailed elevational view looking from the right in Fig. 1; Fig. 4 a side elevational view of one of the scales in position to trip the discharge gate; Fig. 5 a view similar to Fig. 4, showing the parts after the closing of the main gate, but before cutting off the supplemental supply; Fig. 6 an enlarged detailed view showing the discharge gate of a receptacle; Fig. 7 a detailed view of the counter-balanced main gate; Fig. 8 a plan view of one of the scales; Fig. 9 a vertical sectional view on line 9—9 Fig. 10; Fig. 10 a vertical sectional view on line 10—10—, Fig. 9; Figs. 11, 12 and 13, detailed views showing in several positions the device for interrupting the rising of the scale beam; Fig. 14 a detailed view of the gate controlling the supplemental supply; and Fig. 15 a plan view of the supplemental supply gate.

The same reference characters are used to designate the same parts in the several figures of the drawings.

Reference letter A designates a hopper to which the material to be weighed is delivered. Depending from the hopper A are a plurality of branches $A'$, $A^2$, and $A^3$. Each of the branches of the hopper delivers material to a separate automatic scale, such scales adapted to successively discharge the quantities of weighed material to a common outlet funnel $A^4$, at the lower end $a^4$ of which bags or other containers are adapted to be placed to receive the successively discharged quantities of weighed material.

It will of course be understood that my invention is not limited to the employment of three automatic scales, but a greater or less number may if desired be used. Each of the automatic scales is the same in construction and operation, and hence it will only be necessary to describe in detail one of such scales in order that the construction and operation of all of them may be understood.

Each scale comprises a chamber B open at its top, into which the lower end of one of the branches of the supply hopper extends. The chamber B is provided with a front wall $B^3$, adjacent to which is a partition $b^3$ forming the main supply passage way. A partition $b^2$ is formed as a continuation of the partition $b^3$, and together with the rear wall $B^2$ of the chamber forms a supplemental supply passage. Located below and spaced apart from the lower edge of the partition $b^2$ is an inclined wall $b^4$. The chamber B may conveniently be formed integrally with a supporting plate $B'$ adapted to be secured to any suitable support. A web $b$ projects outwardly from the plate $B'$ and extends upwardly to the under surface of the inclined bottom $b^4$ of the chamber.

As a convenient means for supporting the plurality of chambers B I have shown a frame D comprising upper and lower portions united by vertical strips $D'$. To each of the strips $D'$ is secured the supporting plate $B'$ of one of the chambers B. The frame D may be secured to any suitable support, such for instance as vertical angle bars, one of which is indicated at E in Fig. 2. Bolts $E'$ and $E^2$ project horizontally from each of the angle bars E and extend through holes in ears $d'$ and $d^2$ at the ends of the supporting frame D. The bolts are surrounded by sleeves to space the plate D the desired distance away from the supporting beams.

It will of course be understood that the several scales may be supported in the desired relation to each other and to the supply hopper by any suitable structure, the supporting structure shown being merely one which may be conveniently used.

Extending to the rear of each of the chambers B are a pair of lugs $B^5$ and $B^6$, upon which are mounted studs $b^5$ and $b^6$, having "V" shaped grooves in their upper surfaces. C indicates a scale beam for each scale provided with lugs $C^5$ and $C^6$ adapted to over-lie the lugs $B^5$ and $B^6$. Posts $c^5$ and $c^6$ are secured beneath the lug $C^5$ and $C^6$ in any suitable manner as by means of screw threaded portions extending through holes in the lugs and engaged by nuts on the top of the lugs. The under surfaces of the posts $c^5$ and $c^6$ are "V" shaped and are adapted to rest within the grooves in the underlying posts $b^5$ and $b^6$, thereby forming knife edge supports for the scale beam. A weight such as indicated at $C^3$ in Fig. 2 is adjustably supported upon the scale beam by means of clamp screws $c^3$. A screw threaded rod having thereon an adjustable weight $c$ projects from the end of the scale beam. The portion of the scale beam projecting to the opposite side of the knife edge supports from the weight, is bifurcated, the two portions $C'$ and $C^2$ of which extend on the opposite sides of the chamber B. Upon the ends of the bifurcated portions of the scale beam are supported posts $c'$ and $c^2$ the upper surfaces of which are "V" shaped and which engage "V" shaped grooves in the under ends of studs $f'$ and $f^2$, secured beneath the upper ends $F'$ and $F^2$ of a weighing receptacle F. Any suitable means may be provided for securing the studs beneath the inturned, upper ends of the arms of the receptacle, such for instance as cotter pins as shown in Fig. 8.

$f$ indicates a weight secured to the front wall of each of the weighing receptacles F in order to counter-balance the additional weight carried by the rear wall of each receptacle owing to the latches thereon, which will be subsequently described.

The weighing receptacle F is provided with an open top and underlies the main and supplemental supply passage ways leading from the chamber B. The main supply discharge way is controlled by a gate S having supporting arms extending on the opposite sides of the chamber B and pivotally secured in any suitable manner to the side walls of the chamber. One of the arms $s$ which support the gate S is extended above its pivot and is provided with an elongated slot $s^2$ therein. S' indicates a tube adapted to contain a quantity of mercury which may be inserted therein by removing the plug $s'$ which closes the open end of the tube. The tube S' is provided with an ear $S^2$ which supports a screw extending through the slot $s^2$. By means of the screw and slot the position of the tube S' relatively to the gate may be adjusted. Projecting forwardly from the ear $S^2$ is a screw threaded rod $S^3$ upon which is supported an adjustable weight $s^3$. A stud $s^4$ is carried on the arm $s$ of the gate at a point forward of its pivot. The support F' of the weighing receptacle F is provided with a lug $S^4$ adapted to engage the stud $s^4$ to control the opening and closing of the gate S.

Each of the receptacles F is provided with a discharge gate G having arms G' and $G^2$ located on the opposite sides of the receptacle and to the walls of which they are pivotally secured. Gate G is so connected to the receptacle that it will by gravity fall into position to close the opening leading downwardly from the receptacle. The gate is provided with ears $g'$ and $g^2$ extending rearwardly at its upper edge which support a rod $g$. A pair of latches H' and $H^2$ are pivotally secured intermediate of their ends to the rear wall of the receptacle in any suitable manner, as for instance by a rod H supported by brackets $h$, as clearly shown in Fig. 6. The portions of the latches extending downwardly from the rod H are of slightly different lengths so that when the gate G is completely closed one of them, as $H^2$, will swing above the rod $g$ and lock the gate closed, while if the gate cannot entirely be closed owing to a particle, such for instance as a grain of coffee, being interposed between the gate and the lower edge of the receptacle, then the shorter latch H' will swing above the rod $g$ and retain the gate in such slightly opened position. The upper ends of the latches are curved and extend above a shaft N and are adapted to be engaged by a projection $o$ on such shaft to be oscillated out of engagement with the discharge gate G.

The shaft N extends beneath the several chambers B and is journaled in the webs $b$. The shaft N may be rotated by means of a pulley $n$ fixed thereon which is connected by a belt $l$ with a pulley $k$ fixed upon a power shaft K. A pulley L is loosely mounted upon the end of the shaft K and is adapted to receive rotary motion from any suitable source of power by means of a belt. The inner hub of the pulley L is provided with a tooth $l'$ adapted to be engaged by a tooth $k'$ on a sleeve K', the latter being splined upon the shaft K. A groove $k^2$ is formed in the sleeve K' and is engaged by pins $m$ carried in a yoke at the upper end of a lever M, the latter being fulcrumed upon a bracket M'. The lever M below this fulcrum is provided with a stud $m'$ adapted to engage any one of several radial slots $n'$ formed in a disk N' fixed upon the end of the shaft N.

A finger O is secured to the shaft N adjacent each of the scales and is adapted to engage the cam surface $p'$ of a lever P, the latter being fulcrumed intermediate of its ends upon the web $b$. The forward end of the lever P overlies a stud $p$ fixed to the corresponding side of the receptacle F. The lever P is provided with a weight P' to balance the same.

The power shaft K extends through the several chambers B intermediate of the rear walls $B^2$ and partitions $b^2$ thereof. The portion of the shaft K within each chamber carries two sets of inwardly projecting pins $r'$ and $r^2$ fixed upon collars R' and $R^2$, which rotate with the shaft and extend within the openings in the side walls of the chamber. The series of pins are staggered with respect to each other and are spaced apart such distance as to allow the passage of the material which is being weighed between the same. Located within the chamber above the shaft K is a deflecting plate $b'$ forming between the lower edge thereof and the series of pins a passage way through which the material is directed by rotation of the pins with the shaft.

A pair of brackets W' and $W^2$ project from the arms F' and $F^2$, which support the weighing receptacle F. The brackets support at their ends a bar W by means of screws $w$ extending through the brackets into holes in lugs on the ends of the bar W. A plate $W^4$ is secured to the inner surface of the bar W by any suitable means, such for instance as screws $w^2$. A channel is formed between the plate $W^4$ and the bar W within which a number of sections $W^3$ are adapted to move vertically. The upper ends of the sections $W^3$ are provided with flanges $w^3$ which over-lie the upper edge of the bar W so that the sections are prevented from dropping downwardly out of engagement with the bar W by means of such flanges. The lower ends of the sections $W^3$ over-lie the outwardly projecting portion of the bottom wall $b^4$ of the chamber B and constitute a gate for controlling the flow of material through the supplemental passage way to the weighing receptacle.

In order that the downward movement of the weighing receptacle may be interrupted after it has received the main supply of material, a device shown in Figs. 11 to 13 is provided which prevents the complete rising of the scale beam until the predetermined quantity of material supplied to the weighing receptacle has been completed through the supplemental supply passage. A bracket T is secured to the top portion of the supporting plate D in any convenient manner to permit vertical adjustment, as by means of a screw $t$ passing through an elongated slot in the lower end of the bracket T into engagement with the plate D. The bracket T is provided with a pair of lugs T' and T² spaced apart and located above and below the scale beam C. Adjustable stops $t'$ and $t^2$ are carried by lugs T' and T² and limit the upward and downward movement of the scale beam. Pivotally mounted upon the bracket T adjacent the lug T² is an oscillatory stop plate U provided with a projection $u^2$ underlying the scale beam and with a projection $u'$ adapted to swing transversely relatively to the scale beam. At the upper end of the plate U is a tube V containing a quantity of mercury which may be inserted therein by removing the plug $v$ which closes an open end of the tube. A stop lug $t^3$ is provided on the bracket T in position to be engaged by the lower end $u^3$ of the plate U when the latter is oscillated, so that the stop $u'$ is out of the path of the upward movement of the scale beam, as shown in Fig. 13.

In order that the weighing receptacles F may be prevented from swinging laterally, links F³ are provided which pivotally connect the weighing receptacles with the supporting frame D.

The operation of my invention is as follows: The material, such as coffee to be weighed, is supplied from any suitable source to the hopper A and thus passes through the branches A', A² and A³ to the chambers B communicating therewith. The material passes from each chamber B through the main and supplemental supply passages to the corresponding weighing receptacle F. When the parts of each scale occupy the position shown in Fig. 2, the material is passing through the main supply into the weighing receptacle and continues to do so until the weighing receptacle has received such a quantity of material that it will overcome the weight of the scale beam and consequently sink. The sinking of the receptacle moves the lug S⁴ downwardly relatively to the stud $s^4$ on the arm $s$ of the gate S. The gate S is consequently permitted to close by gravity, thereby discontinuing the main supply of material to the receptacle. The gate S closes before the exact predetermined quantity of material has been delivered to the receptacle, the necessary amount of material to complete the predetermined amount being then delivered through the supplemental passage way leading beneath the sectional gate W³. The material is positively fed through such supplemental passage by means of the rotating series of pins $r'$ and $r^2$. When the predetermined quantity of material has been completed the receptacle F sinks farther so that the sectional gate W³ rests upon the bottom $b^4$ of the supplemental supply passage way and discontinues further delivery of the material to the receptacle. After the predetermined quantity of material has been thus supplied to the receptacle, the rotation of shaft N brings one of the projections $o$ thereon into contact with the latches H' and H², so that they will be oscillated and their lower ends swung from above the rod $g$ on the discharge gate G. The weight of the material in the receptacle at once swings such gate open and the material passes from the receptacle to the hopper A⁴ from which it is received in a bag or container. After the latches have been tripped so as to permit the discharge gate to open, the projection O on the shaft N engages the cam surface $p'$ on the lever P so that the latter through engagement with the stud $p$ on the receptacle prevents the receptacle from rising until the material has entirely discharged therefrom. Immediately upon the projection O passing from beneath the cam $p'$ the weight of the scale beam lifts the receptacle upwardly ready to weigh another quantity of material. The upward movement of the receptacle lifts the sections of the supplemental supply gate and also through the engagement of the lug S⁴ with the stud $s^4$ on the gate S opens the latter so that material is again supplied to the receptacle. The discharge gate G immediately closes by gravity after the material passes from the receptacle and is held closed by the automatic swinging of the latch H' or H² above the rod $g$. After the closing of the main supply gate S the scale beam C rises from the position shown in Fig. 11 to that shown in Fig. 12, it being prevented from completely rising through contact with the stop $u'$ on the plate U. The engagement of the scale beam with the inclined edge of the plate adjacent the stop $u'$ oscillates the plate to the position shown in Fig. 12, in which the mercury has passed the center of gravity of the plate and immediately oscillates the plate to the position shown in Fig. 13, permitting the scale beam to rise further as the material to complete the predetermined quantity is supplied through the supplemental passage way. After the discharge of the material from the receptacle, the sinking of the scale beam causes the same to engage the stop $u^2$ and thereby oscillate the plate U from the position shown in Fig. 13 to that shown in Fig. 11 preparatory to the plate again interrupting the upward movement of the scale beam.

It will be observed that the main supply gate S is so counterbalanced by reason of the mercury in the tube S' and the adjustable weight $s^3$ that it imposes no appreciable weight upon the receptacle through the contact of the stud $s^4$ with the lug S⁴. The shifting of the mercury after the center of gravity is passed insures a quick closing of the gate S immediately upon the receptacle sinking and removing the lug S⁴ from beneath the stud s⁴.

The relation between the weight s³, the inclination of the mercury tube S' relatively to the gate S, and the relative positions of the stud s⁴ and the lug S⁴, are such that the mercury passes its center of gravity simultaneously with the movement of the lug S⁴ from between the stud s⁴, consequently while no appreciable weight of the gate is imposed upon the receptacle, yet the quick closing of the gate by gravity immediately upon the sinking of the receptacle, is secured.

By making the gate which controls the supplemental supply in separately movable sections, the gate will not be held open by a particle of material, such as a grain of coffee being caught beneath the gate, as only the section engaging the grain will be held up, the other sections falling by gravity and thereby cutting off the supplemental supply.

The projections o on the shaft N are so arranged with respect to each other that the gates of the several weighing receptacles will be successively opened, such intervals however occurring between the successive discharges as to permit the removal of one quantity of weighed material from the hopper A⁴ before the succeeding quantity is discharged.

The radial slots n' are so located with respect to the projections o on the shaft N that when the pin m' engages in one of the slots n' thereby stopping the operation of the machine, one of the receptacles will be at the point of discharge, that is in the position shown in Fig. 4, so that immediately upon the pin m' being withdrawn from the engaged slot one receptacle will be discharged while the shaft N will complete one-third of a revolution before a second receptacle will be discharged. In this manner the receptacles which are discharged after the discharge of the first receptacle have ample time to receive complete loads by the operation of the supplemental feeding fingers.

Each of the projections O through the oscillation of the corresponding lever P performs two functions, namely that of forcing the receptacle downwardly through the engagement of the end of the lever P with the stud p, when the receptacle has received a load less than that of the predetermined quantity of material, and the additional function of preventing the receptacle from rising until the material therein has been entirely discharged.

The oscillating stop plate U prevents the operation of the machine when a greater load is received in a receptacle than that of the predetermined quantity of material, in as much as the abnormal weight oscillates the scale beam to the position shown in Fig. 12 and retains it there so that the plate U cannot oscillate to the position shown in Fig. 13. The scale beam when held in the position shown in Fig. 12, prevents the complete downward movement of the receptacle and hence stops the rotation of the shaft N by reason of the engagement of the projection O with the shoulder on the lever P adjacent the cam surface p'. In a similar manner if the load received in a receptacle is less than that of the predetermined quantity of material and will consequently not oscillate a scale beam to the position shown in Fig. 12, the engagement of the projection O with the cam p' will so quickly force the receptacle downwardly that the scale beam will rise instantly to the position shown in Fig. 12 and will retain the stop plate U locked in such position so that the scale beam cannot further rise. The shaft N is consequently in such instance locked against rotation by the shoulder adjacent the cam surface p'.

In order that the stop-plate U may swing from the position shown in Fig. 12 to that shown in Fig. 13 it is necessary that the weight of the material should nearly counterbalance the weight on the scale beam and consequently permit the scale beam C to swing downwardly slightly, after engaging the stop-plate U as shown in Fig. 12, when therefore the receptacle contains an overload the scale beam after swinging to the position shown in Fig. 12, will not re-bound but be held in such position and thereby prevent the stop-plate from swinging to the position shown in Fig. 13. The complete downward movement of the receptacle by the lever P engaging the stud p is consequently prevented. When the receptacle contains an under-load the scale-beam is not swung from the position shown in Fig. 11 to that shown in Fig. 12, by the weight of the material prior to the engagement of the lever P with the stud p. When the lever P engages the stud p the receptacle is forced quickly downwardly and the scale-beam consequently elevated to the position shown in Fig. 12 and there held, thereby preventing the stop-plate from swinging to the position shown in Fig. 13.

It will be further observed that in my invention the closing of both of the gates which control the main and supplemental supplies is controlled by the downward movement of the receptacle, and as the discharge gate can only be opened when the receptacle has been forced downwardly by the oscillation of the lever P by the projection O it is evident that the discharge gate is positively prevented from opening until the main and supplemental supplies of material have been discontinued.

From the foregoing description it will be observed that I have invented an improved automatic weighing machine possessing a number of advantageous features, whereby its operation is rendered positive and at the same time as rapid as practicable.

Having fully described my invention, what I claim as new and desire to secure by Letters Patent is:—

1. In an automatic weighing machine, the combination with a plurality of scales, each scale comprising a weighing receptacle, a discharge gate, and a latch for retaining the gate closed, of means successively engaging the several latches for effecting the successive openings of the gates of the several receptacles at pre-determined intervals.

2. In an automatic weighing machine, the combination with a plurality of scales, each scale comprising a weighing receptacle, and a discharge gate therefor, of a rotary shaft extending adjacent all of the discharge gates, and means controlled by said shaft for effecting the successive opening of the gates at pre-determined intervals.

3. In an automatic weighing machine, the combination with a plurality of scales, each scale comprising a weighing receptacle, an outwardly swinging discharge gate, and a latch for retaining the gate closed, of a rotary shaft extending adjacent all of the discharge gates, and projections on said shaft for successively engaging said latches to open the gates at pre-determined intervals.

4. In an automatic weighing machine, the combination with a plurality of stationary scales, each scale comprising a weighing receptacle, and a discharge gate therefor, of means for effecting the successive opening of the gates of the several receptacles at pre-determined intervals, and means for controlling the successive rising of the several receptacles at predetermined intervals.

5. In an automatic weighing machine, the combination with a plurality of scales, each scale comprising a weighing receptacle and a discharge gate therefor, of a rotary shaft extending adjacent all of the discharge gates, means controlled by said shaft for effecting the successive opening of the gates at pre-determined intervals, and means actuated by said shaft for controlling the successive rising of the several receptacles at pre-determined intervals.

6. In an automatic weighing machine, the combination with a plurality of scales, each scale comprising a weighing receptacle and a discharge gate therefor, of a rotary shaft extending adjacent all of the discharge gates, a latch for retaining each gate closed, projections on said shaft for successively engaging said latches to permit the gates to open at predetermined intervals, pivoted levers adapted to engage said receptacles to control the successive rising thereof, and projections on said shaft adapted to engage said levers to control the successive rising of said receptacles.

7. In an automatic scale, the combination with a weighing receptacle, of an outwardly swinging discharge gate, means for automatically holding said gate in a closed position, means for automatically holding said gate in a partially closed position, and mechanism for disengaging both of said means from said gate to permit the gate to swing directly from either a closed or partially closed position to an open position.

8. In an automatic scale, the combination with a weighing receptacle, of an outwardly swinging discharge gate, a latch for holding said gate closed, a second latch for holding said gate in a partially closed position, and mechanism for disengaging said latches from said gate to permit the gate to swing directly from either its closed or partially closed position to its open position.

9. In an automatic scale, the combination with a weighing receptacle, of a gravity closing discharge gate, a gravity latch pivotally mounted upon said receptacle to hold said gate closed, a rotary shaft supported adjacent the said receptacle, and a projection on said shaft adapted to oscillate said latch out of engagement with said gate.

10. In an automatic scale, the combination with a weighing receptacle, of means for delivering material to be weighed to said receptacle, a discharge gate controlling the outlet from said receptacle, a rotary shaft located adjacent said receptacle, a latch for holding said gate closed, a projection on said shaft adapted to oscillate said latch out of engagement with said gate, and means actuated by said shaft for controlling the rising of the receptacle after the discharge of material therefrom.

11. In an automatic scale, the combination with a weighing receptacle, of a main supply passage through which material passes to said receptacle, an inclined supplemental supply passage through which material passes to said receptacle to complete the pre-determined quantity of material therein, the lower wall of said supplemental supply passage terminating in a plane below that of the main supply passage and means for controlling both of said passages actuated directly by the falling of the receptacle to close said passages and by the rising of said receptacle to open said passages.

12. In an automatic scale, the combination with a weighing receptacle, of a main supply passage through which material passes to said receptacle, a counterbalanced oscillating gate for opening and closing said passage, a supplemental supply passage through which material passes to said receptacle to complete the pre-determined quantity of material therein, a vertically movable gate for opening and closing said supplemental passage, and means for directly controlling the closing of both of said gates by the sinking of the receptacle and the opening of both of said gates by the rising of said receptacle.

13. In an automatic scale, the combination with a weighing receptacle, of a main supply passage through which material passes to said receptacle, an oscillating gate pivotally supported adjacent said passage, a supplemental supply through which material passes to said receptacle to complete the pre-determined quantity of material therein, a gate carried by said receptacle for opening and closing said supplemental supply passage, and means actuated by the rising and sinking of said receptacle for effecting the opening and closing of said main supply gate.

14. In an automatic scale, the combination with a weighing receptacle, a counterbalanced gate for opening and closing said main passage, means for controlling the opening and closing of said gate by the rising and sinking of said receptacle, a supplemental supply passage through which material passes to said receptacle to complete the pre-determined quantity of material therein, and a gate composed of separately movable sections carried by said receptacle for controlling the flow of material through said supplemental passage.

15. In an automatic scale, the combination with a weighing receptacle, of a supply passage through which material passes to said receptacle, a gate supported adjacent said passage to open and close the same, a shifting weight carried by said gate to counter-balance the same and means controlling the opening and closing of said gate by the rising and sinking of said receptacle.

16. In an automatic scale, the combination with a weighing receptacle, of a supply passage through which material passes to said receptacle, a gate supported adjacent said passage to open and close the same, means controlling the opening and closing of said gate by the rising and sinking of said receptacle, and means for counterbalancing said gate to relieve the receptacle when sinking from the weight of said gate.

17. In an automatic scale, the combination with a weighing receptacle, of a supply passage through which material passes to said receptacle, an oscillating gate supported adjacent said passage to open and close the same, a tube containing mercury fixed to said gate, an adjustable weight carried by said gate, a projection carried by said receptacle and engaging said gate for effecting the opening and closing of the same as the receptacle rises and sinks.

18. In an automatic scale, the combination with a weighing receptacle, of a supply passage through which material passes to said receptacle, and a gate composed of separately movable sections carried by said receptacle, whereby the opening and closing of said passage is controlled by the rising and falling of said receptacle.

19. An automatic scale, the combination with a weighing receptacle, of a passage through which material is supplied to said receptacle, a gate composed of vertically and independently sliding sections controlling said passage, the lower ends of said sections over-lying and adapted to rest upon a wall of said passage-way, and means for raising said gate relatively to said passage to control the flow of material therethrough.

20. In an automatic scale, the combination with a weighing receptacle, of means for supplying a predetermined quantity of material to said receptacle means for normally automatically discharging said receptacle at predetermined intervals, and means for positively preventing the discharge of said receptacle when the weight of the material therein is greater or less than the pre-determined amount.

21. In a power controlled weighing machine, the combination with a weighing receptacle, a scale beam supporting said receptacle, means for delivering material to said receptacle, a discharge gate, means for effecting the opening of said discharge gate upon the complete sinking of the receptacle, and means for preventing the complete sinking of said receptacle when it has received a greater weight than that of the pre-determined quantity of material.

22. In a power controlled weighing machine, the combination with a weighing receptacle a scale beam supporting said receptacle, means for delivering material to said receptacle, means for interrupting the rising of said beam when the receptacle has received its main load, a rotary shaft adjacent said receptacle, a lever adapted to engage said receptacle, a projection on said shaft for oscillating said lever to force the receptacle to the limit of its downward movement, a discharge gate, and means for effecting the opening of said gate when the receptacle reaches the limit of its downward movement.

23. In an automatic weighing machine, the combination with a plurality of scales, each scale comprising a weighing receptacle and a discharge gate therefor, of a rotary shaft extending adjacent all of the discharge gates, a latch for retaining each gate closed, projections on said shaft for successively engaging said latches to open the gates at pre-determined intervals, pivoted levers adapted to engage said receptacles, projections on said shaft adapted to engage said levers to force the receptacles to the limit of their downward movement, a scale beam supporting each receptacle, and means for interrupting the rising of each scale beam prior to the engagement of the lever with the corresponding receptacle.

24. In an automatic scale, the combination with a weighing receptacle, of a scale beam supporting said receptacle, means for delivering a main supply of material to said receptacle, means for delivering a supplemental supply of material to said receptacle to complete the pre-determined quantity of material, an oscillating frame, having a stop against which the scale beam engages when the receptacle receives its main supply, means for automatically oscillating said frame to remove said stop from above the beam to permit it to further rise upon the receptacle receiving its complete load, and means for automatically oscillating said frame upon the falling of the beam to locate said stop above the beam.

25. In an automatic scale, the combination with a weighing receptacle, of a scale beam supporting said receptacle, means for delivering a main supply of material to said receptacle, means for delivering a supplemental supply of material to said receptacle to complete the pre-determined quantity of material, a frame adapted to oscillate transversely to the path of the beam, a stop on said frame to interrupt the upward movement of the scale beam, means for automatically oscillating said frame to remove said stop from above the beam to permit the further rise of the beam, and a second stop on said frame actuated by the falling of the scale beam to automatically oscillate said frame in position to locate said first stop above the beam.

26. In an automatic scale, the combination with a weighing receptacle, of a scale beam supporting said receptacle, means for delivering a main supply of material to said receptacle, means for delivering a supplemental supply of material to said receptacle to complete the pre-determined quantity of material, a frame adapted to oscillate transversely to the path of the beam, a stop on said frame to interrupt the upward movement of the scale beam, a cam surface on said frame engaged by the beam to shift the center of gravity of the frame whereby the frame will so swing as to remove said stop from above the beam, and a second stop on said frame actuated by the falling of the beam to oscillate said frame and locate said first stop above the beam.

27. In an automatic scale, the combination with a weighing receptacle, of a scale beam supporting said receptacle, means for delivering material to said receptacle, an oscillating frame, a stop on said frame adapted to interrupt the rising of said beam, a chamber containing mercury carried by said frame, means for oscillating said frame to shift said mercury upon the initial rising of said beam, and thereby move said stop to a position to permit the further rising of the scale beam, and means for automatically returning said stop to its initial position upon the falling of the scale beam.

28. In an automatic weighing machine, the combination with a plurality of scales, each scale comprising a weighing receptacle and a discharge gate therefor, of a rotary shaft extending adjacent all of the discharge gates, a latch for retaining each gate closed, projections on said shaft for successively engaging said latches to open the gates at pre-determined intervals, pivoted levers adapted to engage said receptacles to prevent the same from rising, projections on said shaft adapted to engage said levers to control the successive rising of the receptacles, means for rotating said shaft, and means for locking said shaft against rotation when one of said projections is in position to engage the corresponding latch.

29. In an automatic weighing machine the combination with a plurality of scales, each scale comprising a weighing receptacle and a discharge gate therefor, of rotary shaft extending adjacent all of the discharge gates, means actuated by said shaft for successively effecting the opening of the gates of the several receptacles, a power shaft, a driving wheel on said power shaft, a clutch for locking and unlocking said wheel to said power shaft, means for driving said first shaft from the power shaft, and means for unclutching the driving wheel from the power shaft and simultaneously locking said first shaft against rotation.

30. In an automatic weighing machine the combination with a plurality of scales, each scale comprising a weighing receptacle and a discharge gate therefor, of a rotary shaft standing adjacent all of the discharge gates, means actuated by said shaft for successively permitting the gates of the several receptacles to open, a power shaft, a driving wheel on said power shaft, a clutch for locking and unlocking said wheel to said power shaft, means for driving said first shaft from the power shaft, a disk fixed to said first shaft and having slots therein, a lever for actuating said clutch, and a pin carried by said lever adapted to engage one of the slots in said disk.

31. In a power controlling scale, the combination with a weighing receptacle, of a main supply passage leading to said receptacle, a gate for controlling the flow of material through said passage, a supplemental supply passage leading to said receptacle, a shaft extending transversely through said supplemental passage, means for rotating said shaft, and projections carried by said shaft and extending within said supplemental passage.

32. In an automatic scale, the combination with a weighing receptacle, of a main supply passage leading to said receptacle, means for opening and closing said passage, a supplemental supply passage through which material passes to said receptacle after the closing of the main passage, a shaft extending transversely through said supplemental passage, means for rotating said shaft, projections carried by said shaft and extending within said supplemental passage, means for closing said supplemental passage when the pre-determined quantity of material has passed to the receptacle, and a reservoir communicating with said supplemental passage in which the material accumulates when the supplemental passage is closed.

33. In an automatic scale, the combination with a weighing receptacle, of a main supply passage leading to said receptacle, means for opening and closing said passage, a supplemental supply passage, a power actuated shaft extending transversely through said supplemental passage, projections carried by said shaft and extending within said supplemental passage for feeding material to said supplemental passage, a gate controlling said supplemental passage, said supplemental passage being enlarged between said projections and said gate to form a reservoir to receive material when said gate is closed.

In testimony whereof, I sign this specification in the presence of two witnesses.

GEORGE HOEPNER.

Witnesses:
GEO. L. WILKINSON,
BERTHA NATHANSON.